(12) United States Patent
Dennison

(10) Patent No.: US 6,802,217 B2
(45) Date of Patent: Oct. 12, 2004

(54) FLOWMETER FOR COMPRESSED-AIR DISTRIBUTION SYSTEMS

(75) Inventor: Roger Dennison, Lexington, MA (US)

(73) Assignee: CDI Meters, Inc., Belmont, MA (US)

( * ) Notice: Subject to any disclaimer, the term of this patent is extended or adjusted under 35 U.S.C. 154(b) by 0 days.

(21) Appl. No.: 10/304,800

(22) Filed: Nov. 26, 2002

(65) Prior Publication Data

US 2003/0101808 A1 Jun. 5, 2003

Related U.S. Application Data

(60) Provisional application No. 60/336,659, filed on Dec. 5, 2001.

(51) Int. Cl.[7] ................................................. G01F 1/68
(52) U.S. Cl. ..................................................... 73/204.11
(58) Field of Search ........................ 73/204.11, 204.15, 73/204.14, 714, 432

(56) References Cited

U.S. PATENT DOCUMENTS

| | | | | |
|---|---|---|---|---|
| 4,066,095 A | * | 1/1978 | Massa ......................... | 137/486 |
| 4,569,228 A | * | 2/1986 | Bellgardt et al. .......... | 73/866.5 |
| 4,907,456 A | * | 3/1990 | Rozelle ........................ | 73/660 |
| 4,996,872 A | * | 3/1991 | Mueller et al. ................ | 73/38 |
| 5,437,194 A | * | 8/1995 | Lynnworth ................ | 73/861.27 |
| 5,525,040 A | * | 6/1996 | Andreae et al. .............. | 417/32 |
| 6,557,417 B1 | * | 5/2003 | Liu .............................. | 73/714 |
| 6,573,494 B1 | * | 6/2003 | Andrien et al. ............. | 250/288 |

* cited by examiner

Primary Examiner—Edward Lefkowitz
Assistant Examiner—Jewel V. Thompson
(74) Attorney, Agent, or Firm—Brian M. Dingman, Esq.; Mirick, O'Connell, DeMallie & Lougee, LLP

(57) ABSTRACT

A flowmeter which clamps around and seals to a pipe with probes projecting into the pipe through holes in the pipe, the useful separation of the probes being achieved by their entering the pipe through separate holes.

13 Claims, 5 Drawing Sheets

FLOWMETER FOR COMPRESSED-AIR DISTRIBUTION SYSTEMS

CROSS REFERENCE TO RELATED APPLICATION

This application claims priority of Provisional application serial No. 60/336,659, filed on Dec. 5, 2001.

FIELD OF THE INVENTION

The invention relates to instruments for measuring flow in pipes, and specifically to such an instrument that mounts on a pipe.

BACKGROUND OF THE INVENTION

Flowmeters for measurement of flow through pipes may be divided into in-line types, in which the flowmeter interrupts the pipe, insertion types, in which a portion of the meter projects through the wall of the pipe, and external types, with which the pipe remains intact. Typically, insertion meters attach to the wall of the pipe at the point of entry, often by means of a fitting that is welded into the wall of the pipe. Consequently, the exact location of the sensing element within the pipe is dependent on the workmanship of the person installing the fitting, and this may compromise the accuracy of the measurement. Insertion flowmeters of the thermal type, which typically require a heated element and an unheated element, normally are designed to have the probes enter the pipe through a single opening. This requires that the hole in the pipe be large enough to accommodate both elements, and it constrains the spacing of the elements.

SUMMARY OF THE INVENTION

This invention features a flowmeter for installation in existing compressed-air distribution systems. As compared with available flowmeters it provides advantages of low cost and ease of installation.

The flowmeter operates on the well-known thermal principal by which one probe is heated and maintained warmer than a second probe, the amount of heat required to maintain the temperature difference being a measure of the fluid mass velocity. It incorporates novel features, primarily aimed at facilitating its installation. First, since the probes project individually into the pipe through separate holes, the holes that must be drilled are small, and the probes may be widely spaced to minimize interaction, particularly at low flow rates. Second, since the probes are located with reference to the outside surface of the pipe, their position is not dependent on the location of a fitting welded into the pipe. Further, since sealing means are incorporated into the device and it clamps securely onto the pipe, it can be installed without cutting or welding the pipe or adding fittings.

One embodiment of the inventive flowmeter consists of two probes that project through drilled holes into a pipe, two split rings encircling the pipe in which the probes are mounted, and a control enclosure mounted on the rings. The rings resemble well-known shaft collars, each consisting of two halves that are pulled together by screws and thereby clamped onto a cylindrical surface. Each probe is mounted in a hole drilled in the corresponding ring. The control enclosure is attached to the rings with screws, and the wires from the probes pass through the rings and directly into the enclosure. A gasket is placed around each probe, between the ring and the pipe.

A second embodiment of the flowmeter consists of two probes projecting through drilled holes into a pipe, a single split ring encircling the pipe in which the probes are mounted, and a control enclosure mounted on that ring. In other respects the second embodiment resembles the first.

BRIEF DESCRIPTION OF THE DRAWINGS

Other objects, features, advantages and embodiments will occur to those skilled in the art from the following description of two embodiments and the accompanying drawings, in which.

DETAILED DESCRIPTION OF THE INVENTION

The invention constitutes a flowmeter of the thermal type designed in such a way that it is inexpensive to produce and easy to install on a pipe. Such a flowmeter typically employs two probes projecting into the fluid stream: an unheated probe that senses the temperature of the fluid, and a heated probe that is maintained at a temperature higher than that of the unheated probe, the amount of heat required being a measure of the flow rate. The invention concerns the arrangement of the probes and methods of mounting them so that the complete flowmeter may quickly and easily be installed on a pipe in a compressed-air distribution system.

Figure 1:
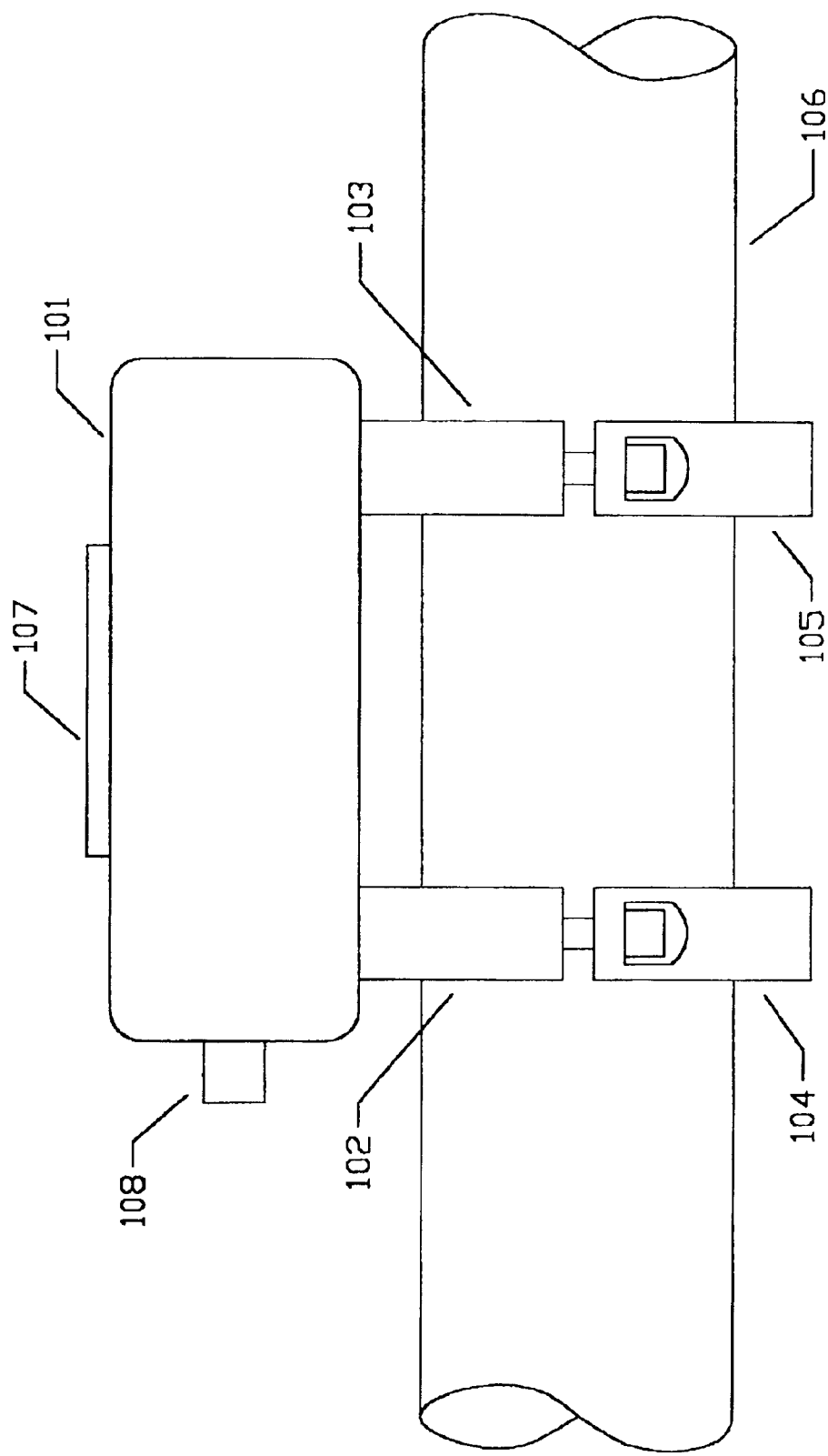
FIG. 1 is an overall view of one preferred embodiment of the inventive flowmeter mounted on a pipe.
Figure 2:
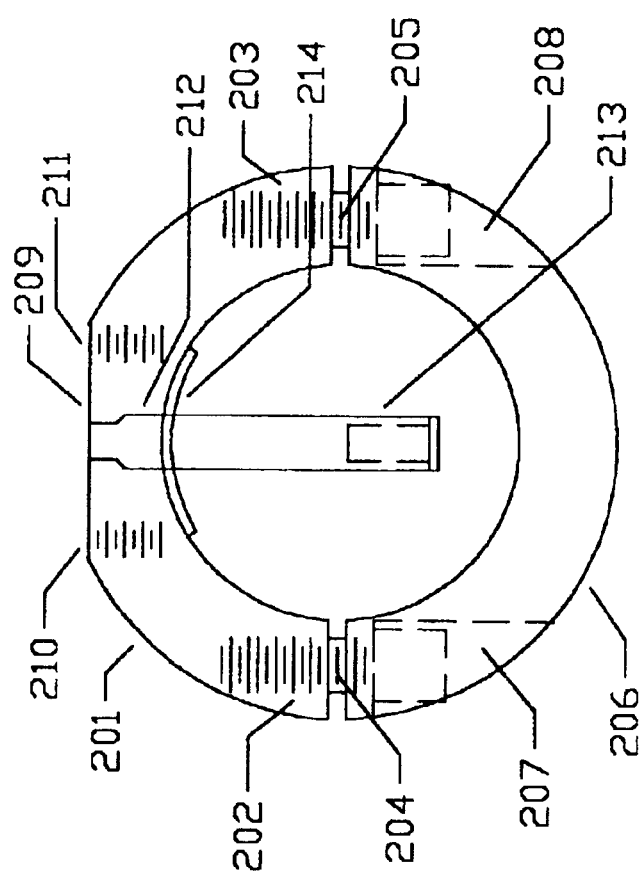
FIG. 2 is side view of one of the split rings of FIG. 1 that clamps to the pipe, with the associated probe and gasket.
Figure 4:
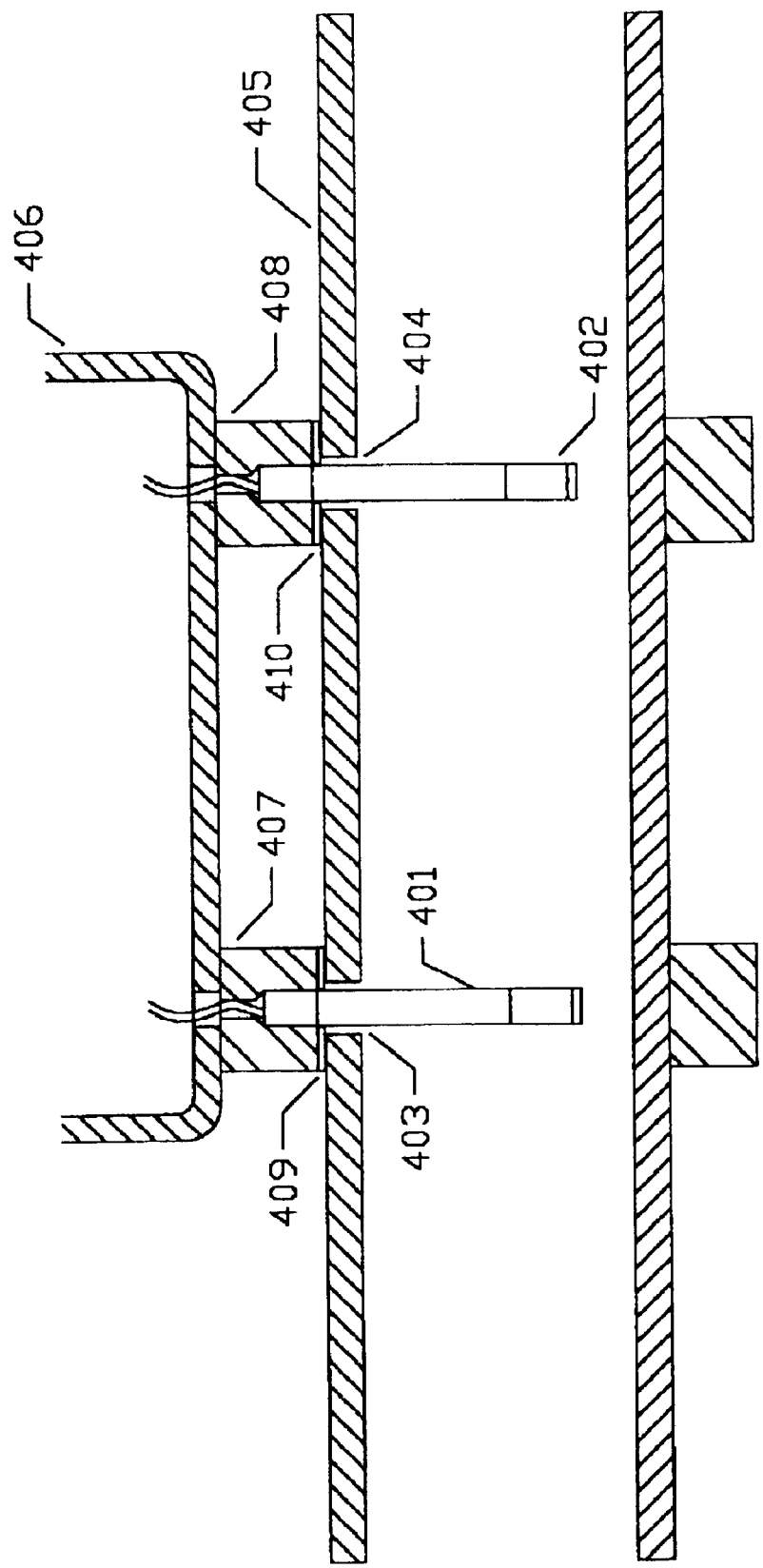
FIG. 4 is a sectional view showing the arrangement of the probes in the pipe for the embodiment of FIG. 1.

FIG. 1 is an overall view of one embodiment of the invention mounted on a pipe; FIG. 2 is a side view of one of the split rings that attach to the pipe with a probe mounted within the ring, and FIG. 4 is a sectional view of this embodiment mounted on a pipe. A control enclosure 101 is affixed by screws (not shown) to the upper portions 102 and 103 of two split rings. The lower portions of the rings 104 and 105 are attached by screws to the upper portions of the rings, these screws being tightened to secure the assembly firmly to the pipe 106. The control enclosure includes a display 107 and a connector 108 for receiving power from an outside source.

The split rings resemble commercially-available shaft collars. As such, the upper portion of each ring 201 (FIG. 2) has threaded holes 202, 203 for screws 204, 205. The lower portion of each ring 206 has counterbored holes 207, 208 for the screws, and the screws are included with the assembly. The upper portion of each ring has a flat 209 and two threaded holes 210, 211 to facilitate mounting of the control enclosure, and stepped hole 212 large enough in its lower portion to accept a cylindrical probe 213, and small enough in its upper portion to prevent the probe from being forced out. Each probe is affixed and sealed in the corresponding ring by an adhesive, such as epoxy. A gasket 214 is adhered to the inside of each ring, surrounding the probe. These gaskets form a seal against the pipe when the screws holding the halves of the split rings together are tightened. The gasket material may be oil-resistant rubber or a pliable fibrous material suitable for use with compressed air.

Figure 3:
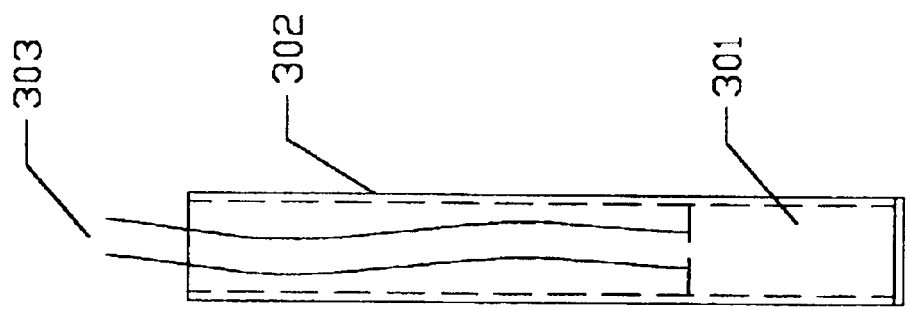
FIG. 3 is an enlarged view of one of the inventive probes.

FIG. 3 shows one of the probes. Each probe comprises a sensing tip 301 that includes an RTD for heating and temperature sensing, mounted within a plated copper body, and a supporting post 302. The sensing tip is designed for good thermal conduction between the RTD and the outside surface of the tip, while the supporting post is designed for minimal heat flow between the sensing tip and the supporting ring. The post may be a thin-walled stainless steel cylinder. The post may extend over the cylindrical surface of the tip as long as a good thermal bond is provided between the post and the tip by means of thermally conductive epoxy or similar material.

FIG. 4 is a sectional view showing the flowmeter of FIG. 1 mounted on a pipe, with the two probes projecting into the fluid. The heated probe 401 and the unheated probe 402 project through drilled holes 403 and 404 into the pipe 405. The probes are displaced longitudinally along the pipe, making it possible to separate them further than would be possible with probes placed side-by-side, particularly in a relatively small diameter pipe. Doing so minimizes the interaction between the probes.

The heated probe may be placed upstream or downstream of the unheated probe. If it is upstream, the unheated probe will be warmed slightly by fluid passing the heated probe. If it is downstream, the flow approaching it (the heated probe) will be somewhat disturbed by the presence of the unheated probe. In either case, if the probes are small in diameter in relation to their spacing (in a ratio of at least 1:15) the resulting errors are minimal and are largely eliminated by calibration. Also shown in section is the control enclosure 406 mounted on the upper portions of the split rings 407 and 408. The gaskets 409 and 410 are shown between the rings and the pipe.

Figure 5:
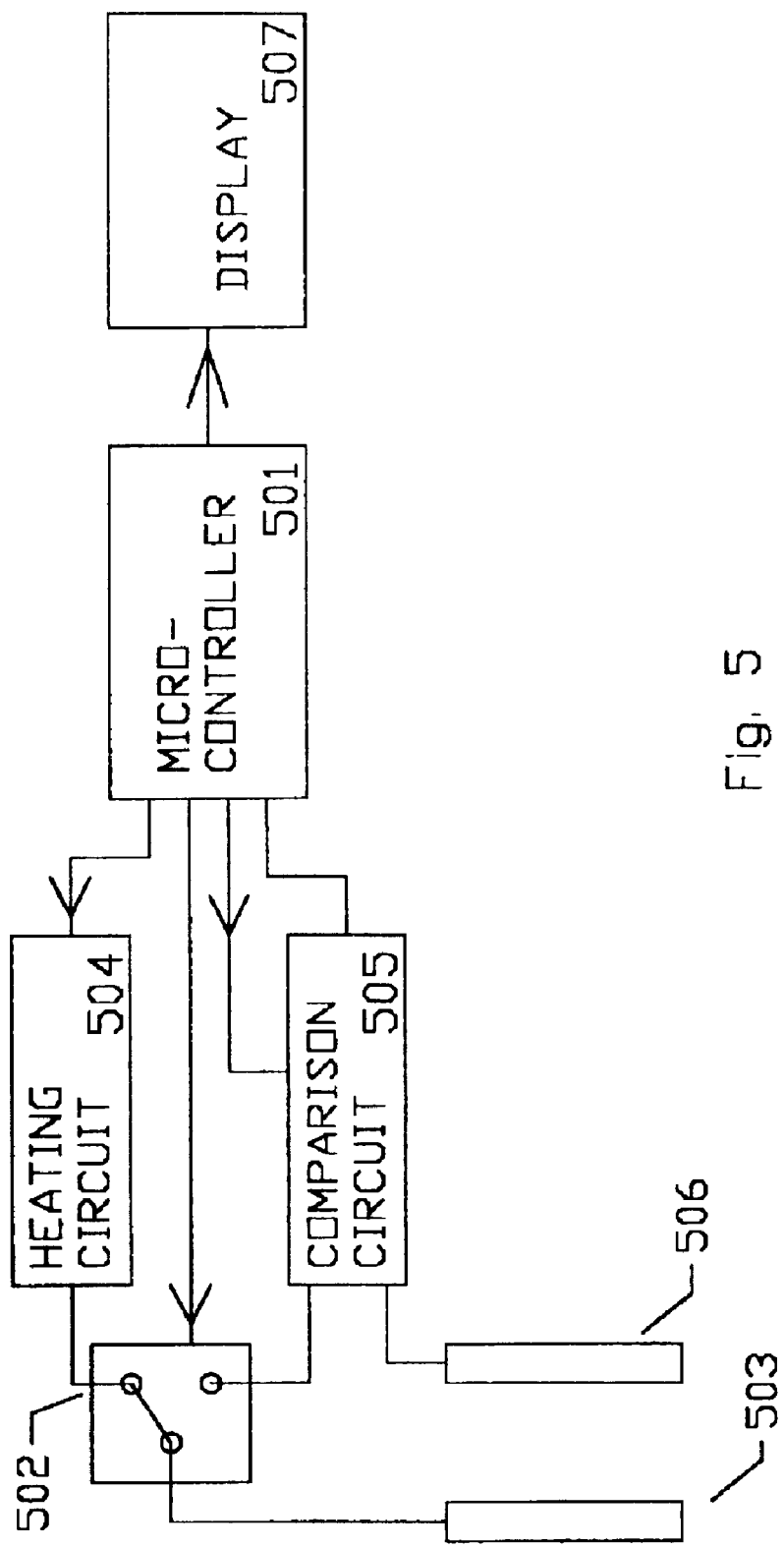
FIG. 5 is a functional block diagram of the inventive device.

FIG. 5 is a schematic illustration of the measurement process for the invention. The microcontroller 501 causes a switching circuit 502 to connect the heated probe 503 to a heating circuit 504 for a fixed period of time. The heating circuit compensates for the variation in resistance of the heated probe with temperature in order to provide a controlled amount of power for heating. At the end of the heating period, the microcontroller causes the heated probe to be connected to the comparison circuit 505. Also connected to this circuit is unheated probe 506. The comparison circuit determines the temperature difference between the probes on the basis of their resistances. When the heated tip has cooled so that it is within a pre-determined temperature differential of the unheated tip (typically within 10 degrees F.) the comparison circuit so indicates to the microcontroller, and the microcontroller initiates another heating cycle. On the basis of the amount of time since the start of the previous heating cycle, the microcontroller calculates the flow velocity (by interpolating in a lookup table) and it sends to the display 507 a signal representing the flow rate, calculated on the basis of the pipe size and the velocity. To minimize the heating of the tips by current used for measurement, the microcontroller causes the measurement circuit to be energized only when necessary for periodic comparisons of resistances.

Figure 6:
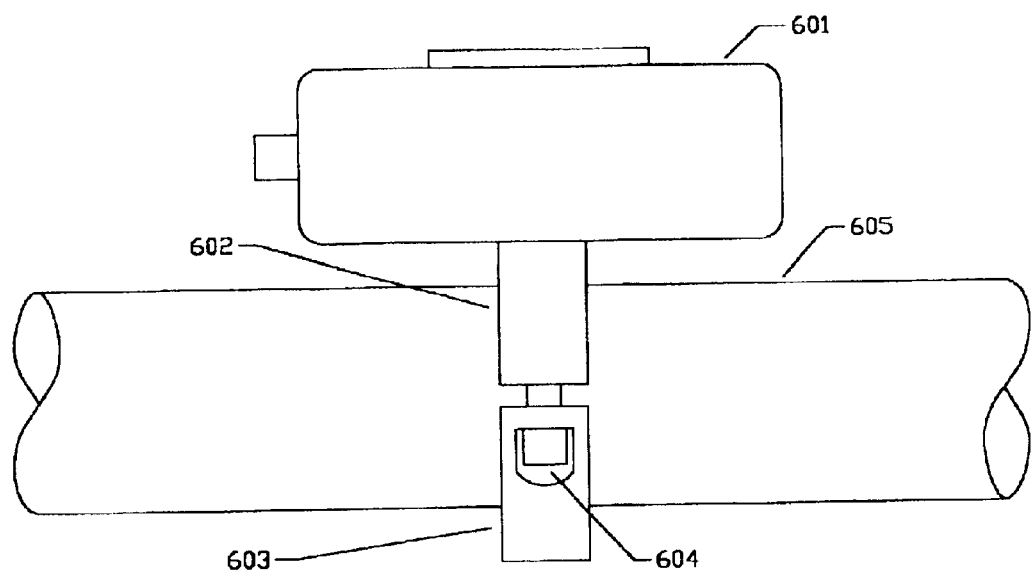
FIG. 6 is an overall view of the second embodiment of the inventive flowmeter mounted on a pipe.
Figure 7:
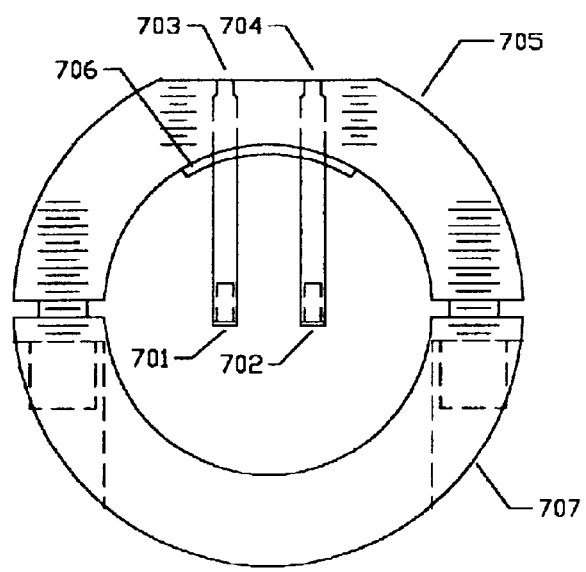
FIG. 7 is a side view of the single split ring of FIG. 6 showing the associated probes and gasket.

FIG. 6 and FIG. 7 show an alternative embodiment of the invention in which a single split ring is used to mount the probes and to support the enclosure. FIG. 6 is an overall view of the second embodiment of the invention mounted on a pipe; FIG. 7 is a side view showing the single split ring with two probes mounted within it. The control enclosure 601 is attached to the upper portion 602 of the split ring by screws (not shown). As with the first embodiment, the lower portion of the split ring 603 is attached to the upper portion by screws, securing the assembly onto a pipe 605.

FIG. 7 shows the single split ring of the second embodiment with two probes 701 and 702 mounted in drilled holes 703 and 704 in the upper portion of the split ring 705. As in the first embodiment, a gasket 706 surrounds the probes; in this case a single gasket may be used to seal around both probes. In other respects the split ring(s) and the probes resemble those in the first embodiment. Other aspects of the invention, including the mode of operation and features of the control enclosure, are the same as in the first embodiment. To install the flowmeter, the user first removes air pressure from the air line where the meter is to be installed, and then drills the two holes required for the probes. Next he inserts the probes into the holes, and attaches the lower halves of the rings to the unit with the screws provided. Finally, he connects a suitable source of power to the unit, typically from a wall-plug adaptor, and turns on the compressed air. The display on the unit will now indicate air flow in units of mass flow rate (scfm).

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. An instrument mounted on a cylindrical pipe having a circumference, that instrument requiring that two probes project into the pipe, comprising:

(a) a first probe mounted in a first mounting portion, the first mounting portion having an inner surface surrounding the first probe, the inner surface generally cylindrical so that it follows the circumference of the outside of the pipe, (b) a second probe mounted in a second mounting portion, the second mounting portion having an inner surface surrounding the second probe, the inner surface generally cylindrical so that it follows the circumference of the outside of the pipe, (c) two spaced holes in the pipe, each receiving one of the probes, (d) sealing means interposed between the mounting portions and the pipe, and (e) means for mounting the first and second mounting portions to the pipe.

2. The pipe-mounted instrument of claim 1, further comprising a single control enclosure that is mounted on both the first mounting portion and the second mounting portion.

3. The pipe-mounted instrument of claim 1 wherein one of the probes is heated and one is not, and further comprising means, responsive to the probes, for determining fluid flow rate in the pipe.

4. The pipe-mounted instrument of claim 1 wherein the first and second mounting portions each comprise split rings.

5. The pipe-mounted instrument of claim 4 wherein the sealing means comprises a gasket on the underside of each split ring and surrounding each probe.

6. A flowmeter for mounting on a pipe and for measuring flow in that pipe, of the type that senses flow using at least two spaced probes projecting into the pipe, one of those probes being heated, in which separation between the probes is achieved by the probes penetrating the pipe wall through at least two separate, spaced holes.

7. The flowmeter of claim 6 wherein at least two probes are spaced circumferentially around the pipe.

8. The flowmeter of claim 7 wherein the at least two probes are mounted along the same pipe circumference.

9. The flowmeter of claim 8 further comprising a single mounting means for mounting the at least two probes.

10. The flowmeter of claim 9 wherein the single mounting means comprises a split ring.

11. The flowmeter of claim 6 in which probes are displaced lengthwise along the pipe.

12. An instrument mounted on a cylindrical pipe having a circumference, the instrument requiring for its operation two penetrations of the pipe, the instrument supported by at least one split ring having an inner surface that is generally cylindrical so that it follows the circumference of the outside of the pipe, the at least one split ring also assisting in sealing around the penetrations of the pipe.

13. The instrument of claim 12 wherein there are two split rings, each with a gasket on its underside surrounding a pipe penetration such that each assists in sealing around a pipe penetration.

* * * * *